US007114542B2

(12) United States Patent
Pelligra

(10) Patent No.: US 7,114,542 B2
(45) Date of Patent: Oct. 3, 2006

(54) CARPET TAPE DISPENSER

(76) Inventor: Debbie Pelligra, 301 N. Martin St., Malakoff, TX (US) 75148

( * ) Notice: Subject to any disclaimer, the term of this patent is extended or adjusted under 35 U.S.C. 154(b) by 188 days.

(21) Appl. No.: 10/896,003

(22) Filed: Jul. 22, 2004

(65) Prior Publication Data
US 2006/0016563 A1   Jan. 26, 2006

(51) Int. Cl.
*B29C 65/20* (2006.01)
*B32B 37/06* (2006.01)
(52) U.S. Cl. .............. 156/526; 156/304.4; 156/304.7; 156/523; 156/577; 156/579
(58) Field of Classification Search ............... 156/523, 156/526, 574, 577, 579, 304.3, 304.4, 304.7
See application file for complete search history.

(56) References Cited

U.S. PATENT DOCUMENTS

| 2,192,634 | A | * | 3/1940 | Blomquist | ............ 156/494 |
| 3,837,976 | A | * | 9/1974 | Davidsson | ............ 156/513 |
| 4,174,249 | A | * | 11/1979 | Bopst, III | ............ 156/577 |
| 4,581,091 | A | | 4/1986 | Lane | |
| 4,584,040 | A | | 4/1986 | Anderson | |
| 4,613,396 | A | | 9/1986 | Scarborough | |
| 4,729,810 | A | | 3/1988 | Brooks | |
| 5,290,390 | A | | 3/1994 | Roman et al. | |
| 5,389,186 | A | | 2/1995 | Knockum | |
| 5,453,150 | A | | 9/1995 | Hoopengardner | |
| 6,302,178 | B1 | | 10/2001 | Givens | |

\* cited by examiner

*Primary Examiner*—Mark A. Osele
(74) *Attorney, Agent, or Firm*—Richard C. Litman

(57) ABSTRACT

The carpet tape dispenser has a convex forward wall, a concave rearward wall, and at least one sidewall joined to the convex forward wall and concave rearward wall to define an arcuate main body having a channel therein. At least one plate is fixed to the arcuate main body and extends forward from at least one side wall. The arcuate main body and at least one plate define a view window. An iron engaging arm is fixed to the arcuate main body and adapted to receive a heating iron. A tape mounting arm is fixed to the arcuate main body and extends upward at an angle from the iron engaging arm. A tape holder having an arcuate base and at least one vertical side skirt extending upwardly from at least one edge of the arcuate base is mounted to the tape mounting arm.

15 Claims, 4 Drawing Sheets

CARPET TAPE DISPENSER

BACKGROUND OF THE INVENTION

1. Field of the Invention

The present invention generally relates to apparatus for joining two abutting pieces of carpeting. More specifically, the present invention is a carpet tape dispenser for carpet seaming tape used in the seaming operation between carpet strips, which are normally installed within a home or place of business.

2. Description of the Related Art

A roll of wall-to-wall carpeting typically comes in standard widths of nine, twelve, fifteen or eighteen foot widths. In order to produce a continuous piece of material that will sufficiently cover a floor area, the carpet must be cut and joined together. When this occurs, a carpet installer will join the abutting sections of carpet together with seams. A carpet seaming tape is placed on the floor underneath the carpet backing to secure the abutting carpet edges that are being joined together.

The carpet seaming tape normally has an adhesive strip on the upper surface that is heated by a heating iron to a temperature sufficient to melt the adhesive. Once the adhesive is melted, the abutting edges of the two carpet sections are pressed onto the melted adhesive strip. After the adhesive cools, the two sections of carpeting are bonded in abutted relationship to achieve the appearance of an uninterrupted piece of carpet.

A common practice employed by carpet installers is to manually position the carpet seaming tape beneath the edge portions of carpet pieces to be joined by lifting those edge portions and physically placing the carpet tape in position. However, it is often difficult and time consuming to accurately position the tape centrally beneath the seam being formed. Moreover, the installer often has to reposition the carpet tape to ensure that it is centered between the abutting edges of adjacent carpet sections when applying the heating iron.

Accordingly, there is a need for a carpet tape dispenser that will properly position the carpet seaming tape for an even distribution of adhesive between the abutting edges of the carpet pieces to be joined. There is a further need for a carpet tape dispenser that will reduce carpet installation time by providing a means to dispense the roll of carpet seaming tape while simultaneously heating the adhesive with the heating iron.

Various devices have been proposed for dispensing carpet seaming tape. For example, U.S. Pat. No. 4,581,091, issued Apr. 8, 1986 to Lane, describes a tape holding container having a spindle within the container to dispense a roll of tape. A pair of cylindrical tape guides are positioned at the front and rear of the container to direct the tape from the roll through a discharge passage and across a trailing plate to be heated by a heating iron.

U.S. Pat. No. 4,729,810, issued Mar. 8, 1988 to Brooks, discloses a carpet tape dispenser having a main frame carried by divergent legs and runners. A roll of carpet tape is mounted on a stub extending transversely from a frame member fixed to the main frame. A tape guide is located between a pair of carpet separating arms that extend below the main frame. A handle is pivotally mounted to the main frame to allow the dispenser to be drawn or pushed along the carpet seam. As the dispenser is moved, the guides lift and separate the opposed carpet edges so that the seaming tape can pass between and beneath the separated edges.

U.S. Pat. No. 5,290,390, issued Mar. 1, 1994 to Roman et al., shows a carpet tape seam applicator having a pair of U-shaped bracket portions that are pivoted together at their open ends and have a removable spindle mounted adjacent the pivot to carry a roll of carpet tape. Small wheels are mounted to a tape guide shaft that is positioned at one end of the applicator and a bracket arm is located at the opposite end of the applicator to receive a handle portion of a heat bonding iron. The tape is fed over the tape guide shaft and is unrolled onto the floor surface as the small wheels of the applicator move forward.

Other patents showing carpet seaming tape dispensers include U.S. Pat. No. 4,584,040, issued Apr. 22, 1986 to Anderson (carpet seaming apparatus with a flexible elongated backing of non-stick heat reflective material); U.S. Pat. No. 4,613,396, issued Sep. 23, 1986 to Scarborough (carpet seaming apparatus that includes a hot glue dispensing gun with a nozzle); U.S. Pat. No. 5,453,150, issued Sep. 26, 1995 to Hoopengardner (tape dispenser used in conjunction with a seaming iron); U.S. Pat. No. 5,389,186, issued Feb. 14, 1995 to Knockum (carpet seam tape apparatus with a clamp to engage the carpet seam tape); and U.S. Pat. No. 6,302,178, issued Oct. 16, 2001 to Givens (carpet seaming tool constructed to eliminate the transfer of heat from the iron to the carpet).

None of the above inventions and patents, taken either singly or in combination, is seen to describe the instant invention as claimed. Thus a carpet tape dispenser solving the aforementioned problems is desired.

SUMMARY OF THE INVENTION

The carpet tape dispenser of the present invention generally includes an arcuate main body having a convex forward wall, a concave rearward wall, and a pair of sidewalls that are joined to and extend normal to the opposed sides of the convex forward and concave rearward walls, respectively. The arcuate main body defines a channel therein.

The carpet tape dispenser also includes two plates that are fixed to the arcuate main body and extend forward from the sidewalls. The plates are employed to guide the carpet tape dispenser over a floor surface and between the abutting edges of adjacent carpet sections that are being joined together to form a carpet seam. Both the arcuate main body and the plates are joined together to define a view window for maintaining alignment with the centerline of the carpet seam.

An iron engaging arm is fixed to the arcuate main body and is adapted to receive a heating iron. A tape mounting arm is fixed to the arcuate main body and is positioned to extend at an upward angle from the iron engaging arm. A tape holder is mounted to the tape mounting arm for holding a roll of carpet seaming tape. The tape holder generally includes an arcuate base joined at side edges thereof to two parallel vertical side skirts to hold a roll of carpet tape. The tape holder is mounted to the tape mounting arm and positioned to directionally dispense the carpet tape through the channel of the arcuate main body.

The carpet tape dispenser helps to properly position the carpet seaming tape beneath the carpet backing for an even distribution of adhesive between the abutting edges of carpeting. The carpet tape dispenser also reduces the installation time required during the seaming operation by providing a means to dispense the carpet seaming tape while simultaneously heating the adhesive with the iron to form a bonded carpet seam.

The carpet tape dispenser allows a carpet installer to replace an empty roll of carpet tape without having to remove the carpet tape dispenser during the seaming operation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
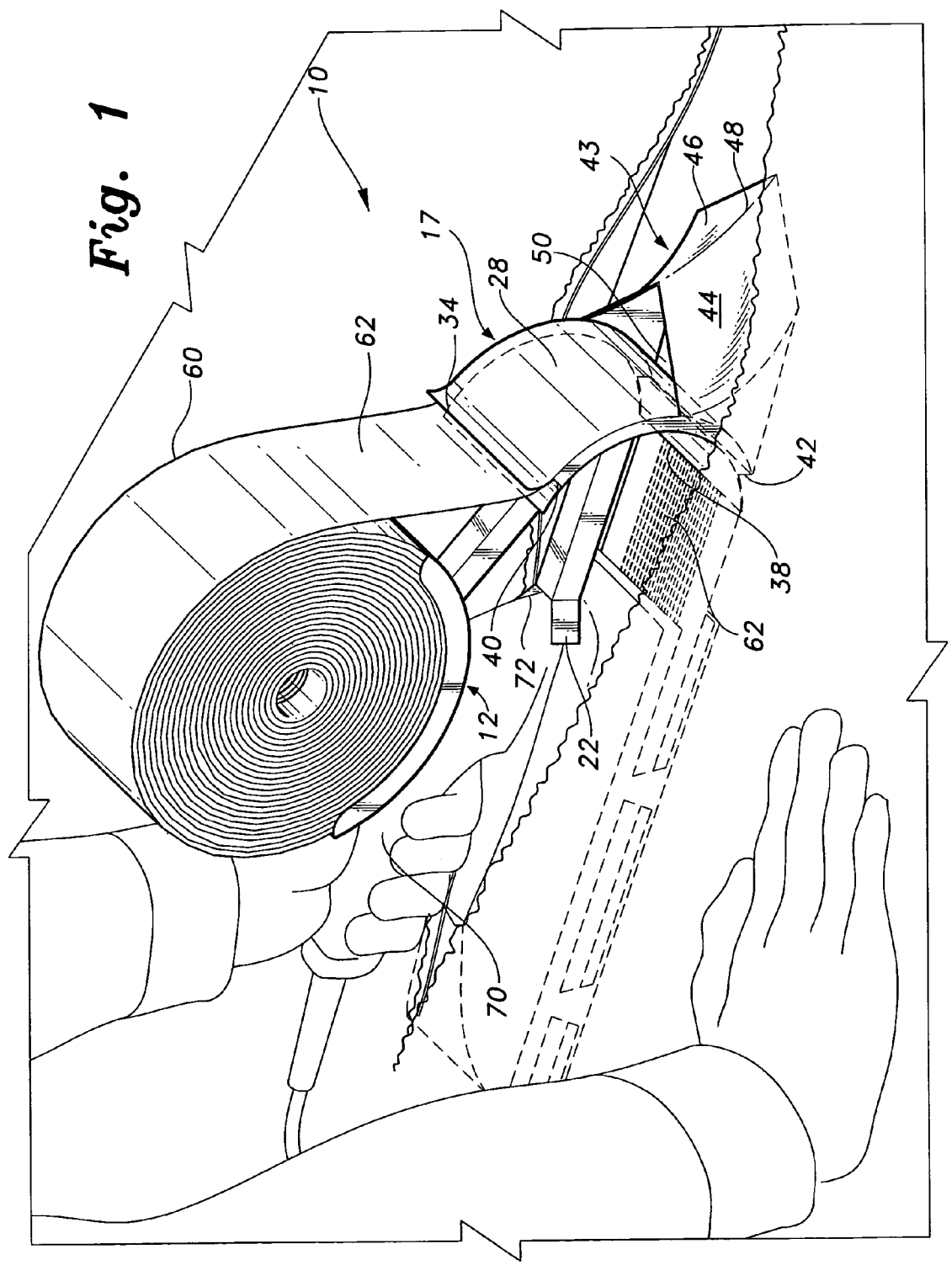
FIG. 1 is an environmental, perspective view of a carpet tape dispenser according to the present invention.

The present invention is a carpet tape dispenser, designated generally as 10 in the drawings. Referring to FIG. 1, the carpet tape dispenser 10 includes an arcuate main body 17, a tape holder 12, and a plow 43.

Figure 2:
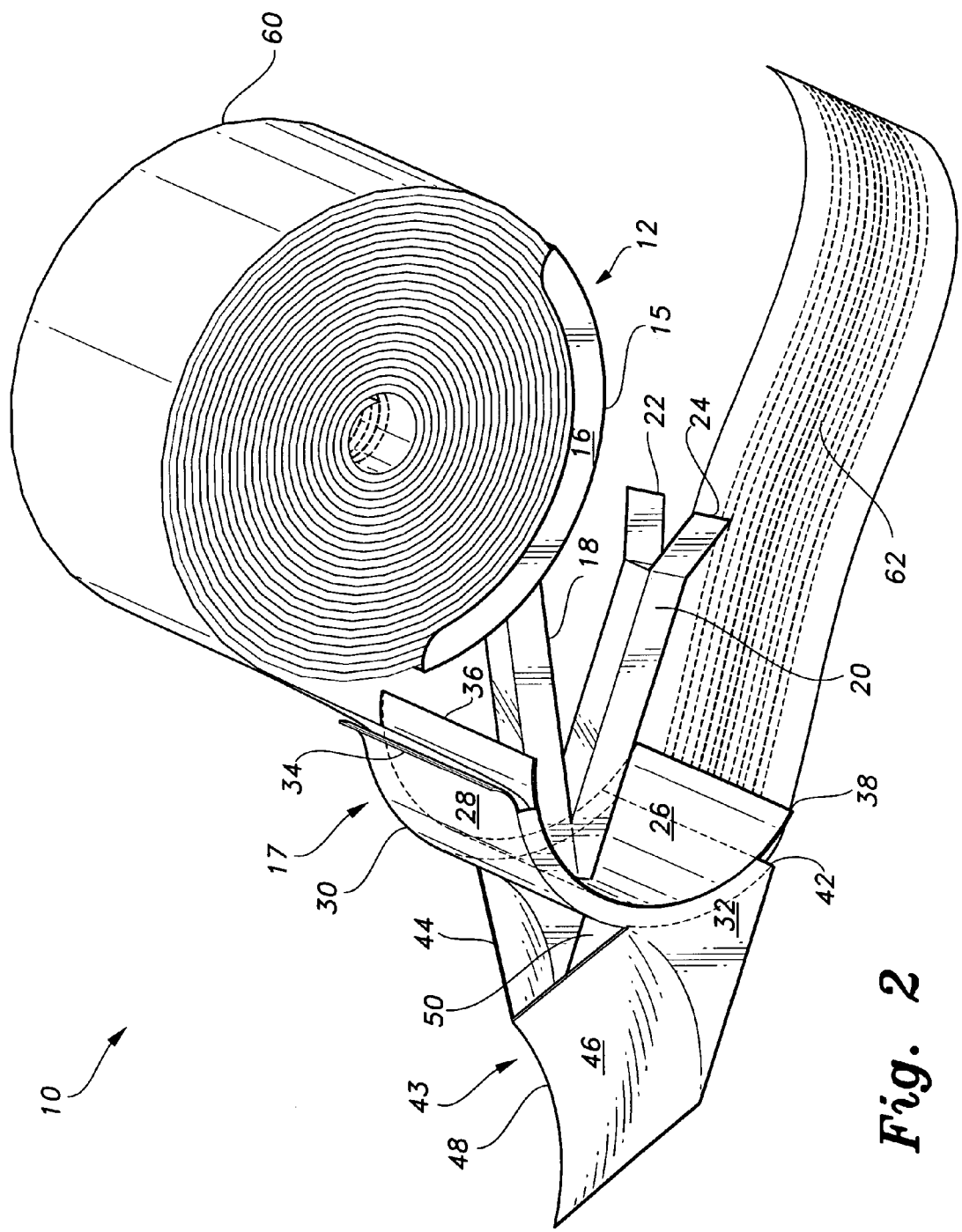
FIG. 2 is a perspective view a carpet tape dispenser according to the present invention.
Figure 3:
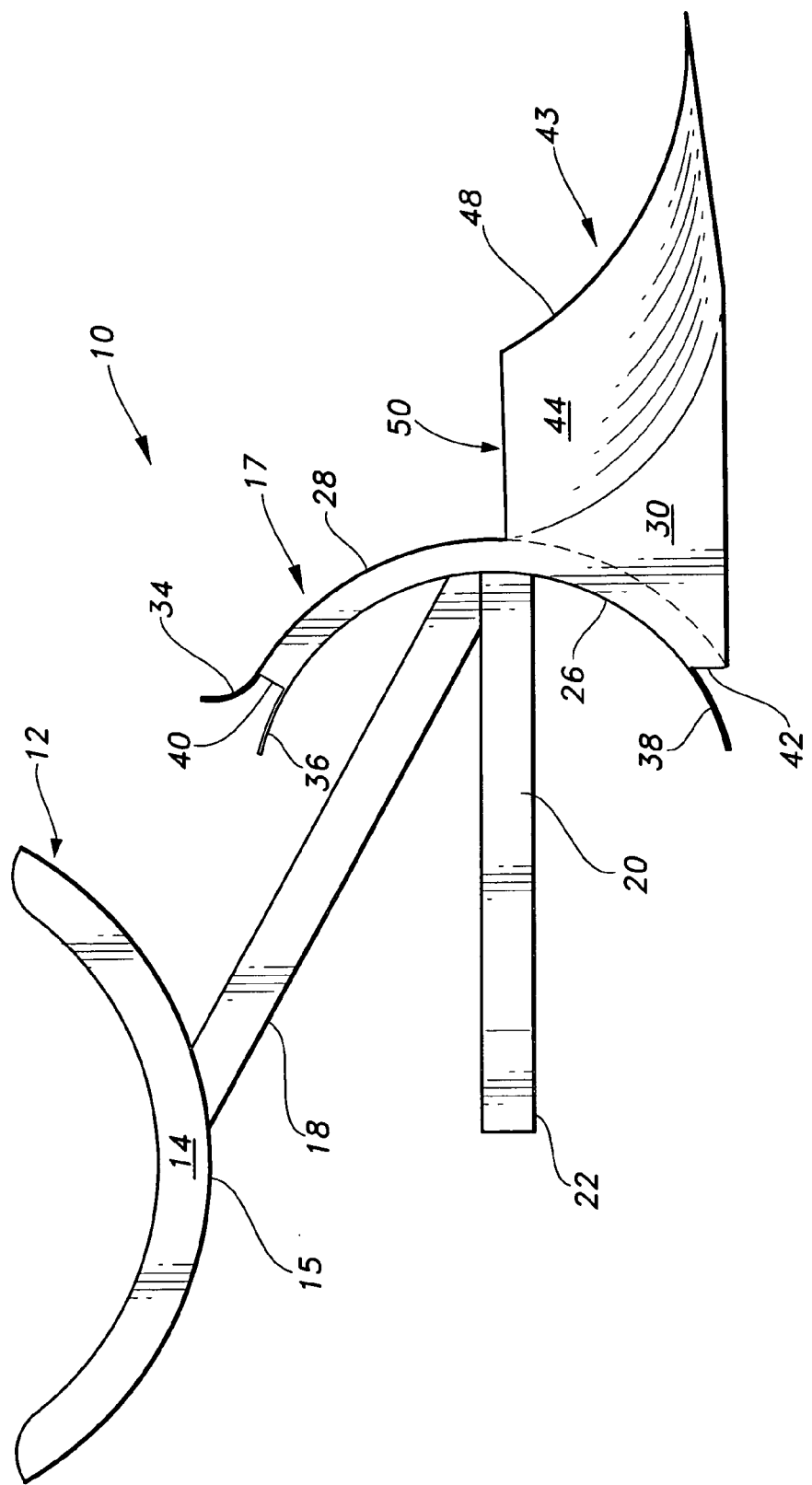
FIG. 3 is a side elevational view of a carpet tape dispenser according to the present invention.

As shown in FIGS. 1–3, the arcuate main body 17 has a convex forward wall 28, a concave rearward wall 26, and a pair of sidewalls 30 and 32 that are joined to and extend normal to the opposed sides of the convex forward wall 28 and the concave rearward wall 26. Two plates, 44 and 46, are fixed to the arcuate main body 17 and extend forward from the sidewalls 30 and 32. The two plates 44 and 46 are joined together to form the plow 43, which guides the carpet tape dispenser 10 over a floor surface and between the abutting edges of the adjacent carpet sections. The plow 43 may be of a generally triangular, arcuate, convex, or rectangular shape.

Figure 4:
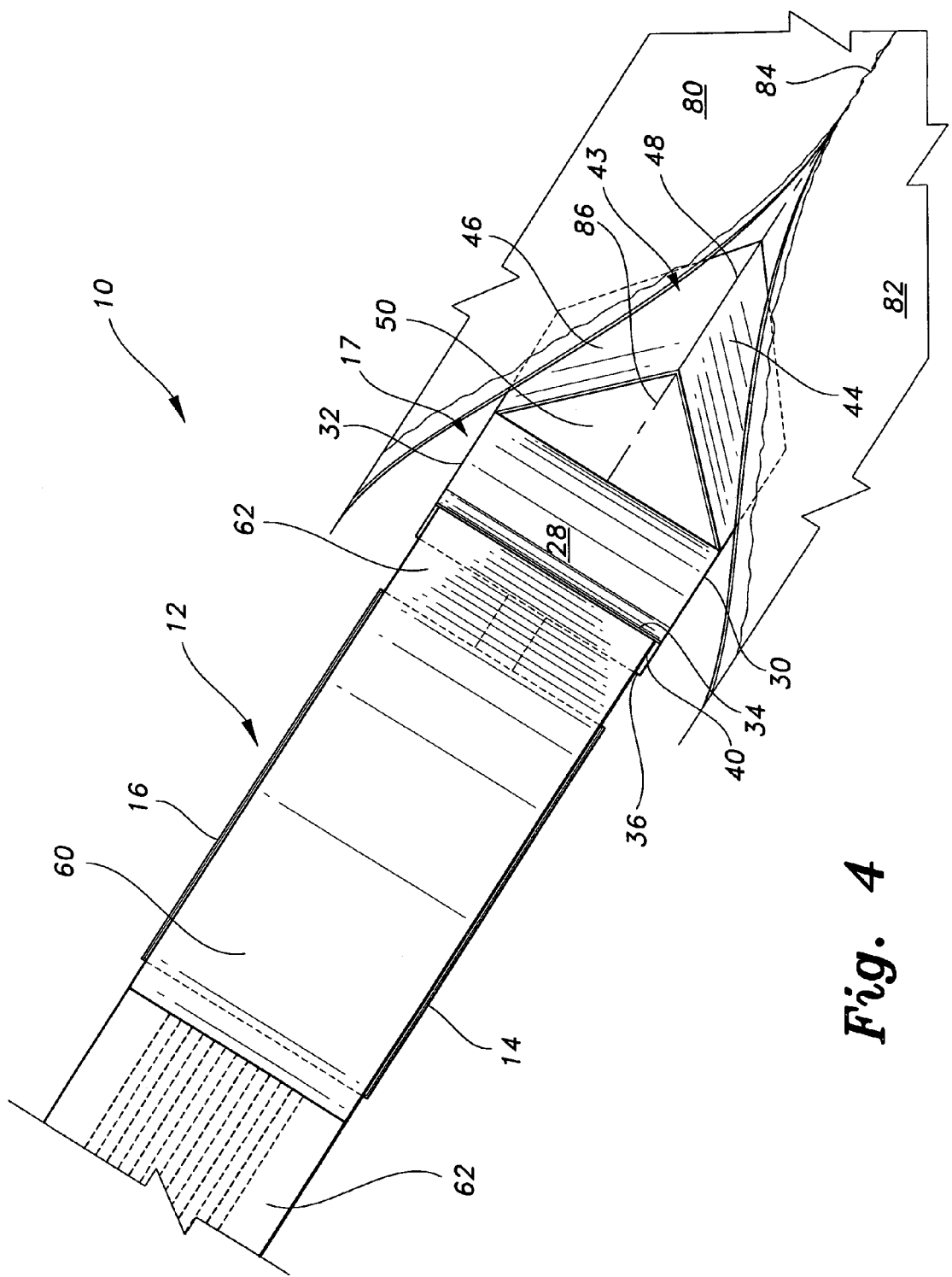
FIG. 4 is an environmental top view of a carpet tape dispenser according to the present invention.

As illustrated in FIG. 4, the two plates 44 and 46 include a leading edge 48 that is substantially central of the arcuate main body 17. Preferably, the two plates 44 and 46 are arcuately ramped forward. The arcuate main body 17 and the two plates 44 and 46, respectively, are joined together to define a view window 50. The view window 50 is used as a visual guide for maintaining alignment with centerline 86 of the carpet seam 84. The view window 50 may be of a generally triangular, circular, crescent, or rectangular shape.

Referring to FIGS. 1, 2 and 3, a channel or slot, is defined between the convex forward wall 28, the concave rearward wall 26, and the sidewalls 30 and 32, respectively. The channel has an upper passage 40 for feeding a carpet tape 62 therein and a lower passage 42 for discharging the carpet tape 62 beneath the abutting edges of the adjacent carpet sections. A trailing edge 38 is positioned at the lower end of the concave rearward wall 26 to directionally dispense the carpet tape 62 under an iron 70.

A feeding edge 36 is positioned at the upper end of the concave rearward wall 26 to directionally guide the carpet tape 62 into the upper passage 40. The feeding edge 36 is generally configured to curve or bend away from the upper passage 40 to provide a smooth contact surface to feed the carpet tape 62 into the channel.

As shown in FIGS. 1, 2, and 3, a guiding edge 34 is positioned at the upper end of the convex forward wall 28 to guide the carpet tape 62 through the upper passage 40. The guiding edge 34 is configured to bend or curve away from the upper passage 40. The curvature of the guiding edge 34 provides a smooth contact surface to feed the carpet tape 62 into the channel. The guiding edge 34 also provides a support for a razor blade or knife (not shown) to cut the carpet tape 62 from a roll of carpet tape 60.

As shown in FIGS. 2 and 3, an iron engaging arm 20 is fixed to the arcuate main body 17 and is adapted for receiving the iron 70. The iron engaging arm 20 has a preferred length of about 5½ inches. Two guide plates 22 and 24 are disposed at one end of the iron engaging arm 20 to engage and secure the iron 70. The two guide plates 22 and 24 are designed and configured to securely hold the forward edge 72 of the iron 70, as shown in FIG. 1, in a central positioned relative to the carpet seam 84, as shown in FIG. 4.

As illustrated in FIGS. 2 and 3, a tape mounting arm 18 is fixed to the arcuate main body 17 and the iron engaging arm 20. The tape mounting arm 18 is positioned to extend upwardly and at an angle from the iron engaging arm 20. Preferably, the tape mounting arm 18 has a length of about six inches.

Referring to FIGS. 2, 3, and 4, the tape holder 12 includes an arcuate base 15 joined at side edges thereof to two parallel vertical side skirts 14 and 16 for holding the roll of carpet tape 60. The tape holder 12 is mounted to the tape mounting arm 18 and is positioned to directionally dispense the carpet tape 62 through the channel.

Alternatively, the arcuate base 15 and vertical side skirts 14 and 16, respectively, are joined together to define a saddle having a generally concave shape that is adapted to hold a roll of carpet tape 60.

In operation, the roll of carpet tape 60 is placed on the tape holder 12. The carpet tape 62 is fed into the upper passage 40 of the channel, or slot, and is then discharged from the lower passage 42 under the trailing edge 38. The guide plates 22 and 24 receive and secure the iron 70. The iron 70 engages the iron engaging arm 20 to move the carpet tape dispenser 10 in a forward direction. The carpet tape 62 is centrally positioned underneath the iron 70.

As the iron 70 moves forward against the engaging arm 20, the frictional force between the iron 70 and the carpet tape 62 dispenses the carpet tape roll 60 through the channel and beneath the adjoining carpet edges 80 and 82. The two plates 44 and 46 separate the carpet seam 84 without damaging the abutting edges 80 and 82 of the two carpet sections to be joined or the carpet pad underneath the carpet seam 84.

The view window 50 allows the carpet installer to properly position the carpet tape 62 along centerline 86 of the carpet seam 84 for an even distribution of adhesive between the abutting edges, 80 and 82, of the carpet sections being joined together.

Advantageously, replacement of carpet tape 62 is accomplished without removing or disengaging the iron 70 from the carpet tape dispenser 10. The combination of the iron 70 and the carpet tape dispenser 10 eliminates the additional step of laying out the carpet seaming tape underneath the two pieces of carpet to be joined, prior to use of the iron 70. Therefore, the carpet tape dispenser 10 promotes efficiency and reduces the time required to install carpeting during the seaming operation.

More advantageously, the iron 70 and carpet tape 62 remain on center with the carpet seam 84 so that the abutting carpet edges 80 and 82 are evenly disposed on the adhesive of the carpet tape 62; therefore, ensuring a proper bond between the abutting edges 80 and 82.

It is preferred that the overall dimensions of the carpet tape dispenser 10 are designed to match the length of the iron 70, which will reduce the carpet installation time. For example, when the carpet tape dispenser 10 abuts up against a wall in a room, the carpet installer can cut the carpet tape 62 along the guiding edge 34, remove the carpet tape dispenser 10, and with a final pass of the iron 70 complete the seaming operation.

The overall width and length of the tape holder 12 will depend on the carpet seaming tape used. For example, if a 3-inch wide roll of carpet seaming tape is used, then the tape holder 12 will have a width of approximately 3¾ inches and a length of approximately 6¼ inches to accommodate the carpet tape roll. Hence, the convex forward wall 28 and the concave rearward wall 26 will have a general width of approximately 3¾ inches.

Preferably, the overall length of the carpet tape dispenser 10 is approximately thirteen inches and the overall height of the carpet tape dispenser 10 is approximately 6¾ inches. It is also preferred that the main body 17 has a general vertical height of approximately five inches measured from the trailing edge 38 to the guiding edge 34. It is further preferred that the main body 17 has a length of approximately 6¾ inches measured from the leading edge 48 of the plow 43 to the end of the trailing edge 38.

It is to be understood that the present invention is not limited to the embodiment described above, but encompasses any and all embodiments within the scope of the following claims.

I claim:

1. A carpet tape dispenser, comprising:
   a convex forward wall, a concave rearward wall, and at least one sidewall joining the convex forward wall and the concave rearward wall in order to form an arcuate main body having a channel defined therein;
   at least one plate fixed to the arcuate main body and extending forward from the at least one side wall to guide the carpet tape dispenser over a floor surface and between abutting edges of adjacent carpet sections, the arcuate main body and the at least one plate being joined together to define a view window for maintaining alignment with a centerline of a carpet seam;
   an iron engaging arm fixed to the arcuate main body and adapted for receiving a heating iron;
   a tape mounting arm fixed to the arcuate main body and extending upward at an angle from the iron engaging arm; and
   a tape holder having an arcuate base and at least one vertical side skirt extending upwardly from at least one edge of the arcuate base, the tape holder being mounted to the tape mounting arm and adapted for holding a roll of carpet seaming tape.

2. The carpet tape dispenser according to claim 1, wherein the channel has a width adapted to a width of the carpet seaming tape.

3. The carpet tape dispenser according to claim 1, wherein the channel includes an upper passage for feeding the carpet seaming tape therein and a lower passage for discharging the carpet seaming tape beneath abutting edges of adjacent carpet sections.

4. The carpet tape dispenser according to claim 1, wherein the tape holder is aligned with the channel to directionally feed the carpet seaming tape through the channel.

5. The carpet tape dispenser according to claim 1, wherein the concave rearward wall includes a feeding edge positioned at an upper end of the concave rearward wall to directionally guide the carpet seaming tape into the channel.

6. The carpet tape dispenser according to claim 1, wherein the concave rearward wall includes a trailing edge positioned at lower end of the concave rearward wall to directionally dispense the carpet seaming tape under the heating iron.

7. The carpet tape dispenser according to claim 1, wherein the convex forward wall has a guiding edge positioned at an upper end of the convex forward wall to directionally guide the carpet seaming tape into the channel and to provide support for a razor blade to cut the carpet seaming tape.

8. The carpet tape dispenser according to claim 1, wherein the iron engaging arm includes at least one guide plate joined at the end of the iron engaging arm and adapted for receiving a heating iron.

9. A carpet tape dispenser, comprising:
   a convex forward wall, a concave rearward wall, and a pair of opposing sidewalls joining the convex forward wall and the concave rearward wall to form an arcuate main body having a slot defined therein;
   two plates fixed to the arcuate main body and extending forward from the opposing sidewalls of the arcuate main body;
   an iron engaging arm fixed to one side of the main body adapted for receiving a heating iron;
   a tape mounting arm fixed to the main body and extending upward at an angle from the iron engaging arm; and
   a tape holder having an arcuate base and at least one vertical side skirt extending upwardly from at least one edge of the arcuate base, the tape holder being mounted to the tape mounting arm for holding a roll of carpet seaming tape.

10. The carpet tape dispenser according to claim 9, wherein the slot has a width adapted to a width of the carpet seaming tape being dispensed therein.

11. The carpet tape dispenser according to claim 9, further comprising two guide plates disposed at one end of the iron engaging arm adapted to secure the heating iron.

12. The carpet tape dispenser according to claim 9, further comprising a trailing edge positioned at lower edge of the concave rearward wall for guiding a carpet seaming tape from the slot to beneath the heating iron.

13. The carpet tape dispenser according to claim 9, wherein the two plates are arcuately ramped forward.

14. The carpet tape dispenser according to claim 9, wherein the two plates are joined together in order to form a plow.

15. The carpet tape dispenser according to claim 9, wherein the two plates are joined together, defining a view window therebetween.

* * * * *